(12) United States Patent
Trujillo

(10) Patent No.: US 8,103,956 B2
(45) Date of Patent: Jan. 24, 2012

(54) ADAPTIVE TECHNIQUE FOR SIGHTLESS ACCESSIBILITY OF DYNAMIC WEB CONTENT

(75) Inventor: Damian Trujillo, Sahuarita, AZ (US)

(73) Assignee: International Business Machines Corporation, Armonk, NY (US)

(*) Notice: Subject to any disclaimer, the term of this patent is extended or adjusted under 35 U.S.C. 154(b) by 440 days.

(21) Appl. No.: 12/209,328

(22) Filed: Sep. 12, 2008

(65) Prior Publication Data

US 2010/0070872 A1    Mar. 18, 2010

(51) Int. Cl.
*G06F 3/00* (2006.01)
(52) U.S. Cl. ........ 715/700; 715/760; 715/764; 715/779; 704/275; 345/156
(58) Field of Classification Search .......... 715/707, 715/711, 729, 745, 865
See application file for complete search history.

(56) References Cited

U.S. PATENT DOCUMENTS

| | | | |
|---|---|---|---|
| 6,309,117 B1 | 10/2001 | Bunce et al. | |
| 6,611,877 B2 | 8/2003 | Korn et al. | |
| 6,934,907 B2 | 8/2005 | Brunet et al. | |
| 7,145,571 B2 | 12/2006 | Jones et al. | |
| 7,554,522 B2 * | 6/2009 | Sinclair et al. | 345/156 |
| 7,818,671 B2 * | 10/2010 | de Souza | 715/709 |
| 7,844,462 B2 * | 11/2010 | Mayer-Ullmann | 704/260 |
| 2005/0108642 A1 * | 5/2005 | Sinclair, II | 715/700 |
| 2005/0120308 A1 * | 6/2005 | Gibson et al. | 715/779 |
| 2006/0090138 A1 * | 4/2006 | Wang et al. | 715/760 |
| 2006/0150110 A1 * | 7/2006 | Dietl et al. | 715/760 |
| 2006/0288283 A1 * | 12/2006 | Schrepp et al. | 715/700 |
| 2007/0028178 A1 * | 2/2007 | Gibson et al. | 715/760 |
| 2007/0050721 A1 * | 3/2007 | de Souza | 715/764 |
| 2007/0198945 A1 * | 8/2007 | Sun et al. | 715/779 |
| 2008/0189115 A1 * | 8/2008 | Mayer-Ullmann | 704/275 |

FOREIGN PATENT DOCUMENTS

JP    08166867    6/1996

OTHER PUBLICATIONS

"aiBrowser for Multimedia—Introducing Multimedia Content Accessibility for Visually Impaired Users," Hisashi Miyashita et al., Oct. 2007; pp. 91-98.
"IBM Announces Tool to Help Visually Impaired 'See' Internet Multimedia", Senior Journal, Mar. 2007, 2 pages.
"Accessibility and Model-Based Web Application Development for eLearning-Environments", Sabina Jeschke et al., 2006; pp. 1161-1165.

* cited by examiner

*Primary Examiner* — Tuyetlien Tran
*Assistant Examiner* — Abimbola Ayeni
(74) *Attorney, Agent, or Firm* — Kunzler Needham Massey & Thorpe

(57) ABSTRACT

One aspect of the present invention includes adaptive techniques used to render dynamic web content for accessibility software applications, such as screen readers. In one embodiment, an operation for improving webpage browsing with accessibility software includes detecting if an accessibility software application is in use, tracking the position of user focus on the webpage, and presenting information to the user based on the position of user focus on the webpage. In a further embodiment, additional content is rendered on the webpage to screen reader applications, and is placed at the position of the screen reader focus in response to dynamic content appearing or changing on the webpage. This additional content is read by the screen reader to inform the user of the dynamic content change, and/or enable the user to quickly perform a specific action on the webpage.

21 Claims, 7 Drawing Sheets

Fig. 1A

ADAPTIVE TECHNIQUE FOR SIGHTLESS ACCESSIBILITY OF DYNAMIC WEB CONTENT

FIELD OF THE INVENTION

The present invention generally relates to the use of dynamic content displayed to users via websites. The present invention more specifically relates to technologies used to enhance the delivery of dynamic website content to visually impaired users, including tracking the position of a user within a dynamic webpage, and communicating newly changed or added dynamic content to the user via a screen reader.

BACKGROUND OF THE INVENTION

Dynamic webpages, such as those utilizing AJAX or Flash technologies, have become prevalent ways of improving user interaction by delivering content responsive to a user's activity within a website. Dynamic webpages further enable content to be automatically changed within the display of the page itself, without requiring the user to go to a separate page or refresh the current view of the page. For example, after an action button or pull down is interacted with on a webpage, an object within the page (such as an error or success message field) may be configured to change its text and display different content. One problem with the use of such technologies, however, is that sightless users who wish to utilize webpages with dynamic content are limited by the capabilities in existing screen reader software to read the updated content.

Screen readers relate the content on webpages to visually impaired users by reading webpage text in a linear, top-to-bottom fashion, outputting this content as audio to the user. Screen readers currently in use, however, have no way of alerting the user to dynamic content that has changed a portion of the webpage that is not currently being read. Thus, a sightless user who is using a screen reader will often have to restart reading all of the content from the top of the webpage to discover what changed, as there is no easy way to determine if dynamic content in the page has been updated once the screen reader has passed the change point.

Current screen reader technology, at most, is capable of alerting the user that something on the page has changed, but is not capable of relaying what this change is, and where on the page the change has occurred. Thus, many dynamic content changes introduced into the webpage are not communicated with the user via the screen reader, which may prevent numerous information and functional fields from being used and understood by visually impaired users.

Various regulations such as Section 508 of the Rehabilitation Act are also relevant to the capabilities and deployment of accessibility technology used by visually impaired users. Section 508 sets forth requirements intended to increase technology accessibility, to ensure government employees with disabilities can fully access and interact with relevant content. Additionally, Section 255 of the Telecommunications Act requires that manufacturers of telecommunications equipment and software ensure that the equipment is accessible by persons with disabilities, whether provided directly or through a peripheral device used by the person with a disability. Further, the Americans with Disabilities Act prohibits discrimination on the basis of disability in employment, programs, and services provided by state and local governments—including goods and services provided by private companies.

Certain website accessibility coding practices such as the Web Content Accessibility Guidelines (WCAG) have been mandated through the World Wide Web Consortium (W3C). At a minimum, a complete implementation of the WCAG enables the Section 508 and Section 225 guidelines to be met or exceeded. Additionally, W3C has created sets of checklists defined in the WCAG as a guide for software and websites to be considered accessible. These guidelines are intended to ensure that all webpages are rendered to accessibility users in a perceivable, operable, understandable, and robust way.

Although these various accessibility requirements and regulations are in place, there is no existing technology that has readily enabled users of screen readers or other software assistance programs to fully utilize dynamic web functionality and easily comply with accessibility standards. To be considered accessible, either a command line based interface or text-based alternative must be provided to allow the user to interact with a dynamic web environment. Although command line or text only versions may provide a basic user interface to make a webpage content accessible, they often do not provide the robust capabilities inherent to time sensitive actions that dynamic web content is most capable of delivering and responding to.

The only complete workaround to the limitations produced by screen readers is for the sightless user to not access dynamic webpages, but this is often not a feasible solution due to the wide deployment and usefulness of dynamic web content throughout the Internet. Thus, the only complete workaround for content providers is to provide separate text-only versions of the webpages in lieu of delivering dynamic content.

As dynamic web technologies are being increasingly deployed throughout the Internet, there is a large concern that the features of assistive technologies for sightless users lack equivalent progress. What is needed are improved ways of delivering of dynamic web content for visually impaired users via use of screen reader technologies that are used to read websites. Additionally, various server side technologies need to be tailored to deliver dynamic content in a more predictable manner. Techniques are needed within dynamic web sites to determine if the user requires special needs or processing, in addition to tracking the positioning of the screen area being read in order to automatically assist special needs readers with the correct placement, alert, and delivery of dynamic content.

BRIEF SUMMARY OF THE INVENTION

One aspect of the present invention includes improving accessibility for sightless users to access content delivered via dynamic webpages. In one embodiment, various measures are implemented within the client screen reader software accessing a webpage and the server rendering the webpage to tailor the web content for use with screen readers. Accordingly, the use of the various embodiments of the present invention results in increased accessibility for sightless users whose ability to interact with websites is dependent on how a screen reader interprets content.

A further aspect of the present invention includes determining if special assistance is needed by the user, to enable the website to dynamically and automatically render accessible content in a format that is friendly to screen readers or other accessibility software. This may be accomplished by performing monitoring and/or detecting functions within the website to determine if the rendered webpage requires special processing for use with the accessibility software.

An additional aspect of the present invention involves a server side implementation of reactive listeners that track the position of the user on the webpage. In one embodiment, the position of the user focus on the page is useful for enabling various content "place holders" located after each logical web unit, to deploy dynamic content on locations within the webpage that would be most helpful or useful to the screen reader or other accessibility software. In one embodiment, once it is determined that the user requires special needs or processing, the screen reader's position on screen is tracked, and dynamic content is delivered at the current position of the screen reader. Positional tracking may be performed as necessary by storing position values within a browser cookie, or alternatively within various other types of persistent data stores.

Therefore, an additional aspect of the present invention includes an improved method of delivering dynamic content to a screen reader through content and alerts strategically placed within a dynamic content webpage. When dynamic content is changed on the website, the website is capable of notifying the user of the event and alerting the user to the event through position relational reporting. In one embodiment, changes to the dynamic content are detected by the screen reader, and dynamic content is inserted after the screen reader's present location. The screen reader can accordingly interact with the new object and deliver the new content to the user.

One embodiment of the present invention includes an adaptive tracking operation used to determine the accessibility needs of a user accessing a dynamic webpage. This embodiment is applicable to accessibility software applications that access textual or image descriptive data and convey the information to a user via non-visual means, such as speaking. Event listeners implemented within a webpage may be used to detect keyboard navigation and thus determine if an accessibility software application is accessing the webpage. A data store is configured to track a position of user focus on the webpage, and whether positional tracking is enabled (i.e., if an accessibility software application is in use). In one embodiment, the data store is implemented within a browser cookie.

The positional tracking is enabled when navigation is performed by a keyboard, and is disabled when navigation is performed within the webpage by a mouse. If enabled, as the user navigates within the webpage, the position of user focus (i.e., the position of the accessibility software application) is determined from data collected from the webpage listeners. The position of user focus on the webpage is reset if navigation is performed to another webpage. Additionally, the position of user focus is tracked within the data store, and is later retrieved from the data store when information is about to be rendered to the user.

A further embodiment of the present invention includes adaptively improving sightless accessibility of dynamic web content by delivering enhanced content to a user accessing a dynamic webpage with a screen reader. As the user accesses the webpage, it is determined if the user is utilizing a screen reader software application to audibly read content displayed within the webpage. If a screen reader is in use, a helpful form of dynamic content will be rendered to the user.

The steps taken to display helpful content include configuring a data store to store a value of a position of focus of the screen reader navigating the webpage. In one embodiment, this data store is implemented through use of a cookie. Next, the position of screen reader focus on the webpage is tracked by calculating the position as the screen reader interacts with objects contained within the webpage, as the position value within the data store is updated.

After dynamic content is displayed within the webpage, an object is dynamically displayed within the webpage at the position of screen reader focus. The displayed object accordingly contains informative content related to display of the dynamic content, and may be accompanied with an ability for the user to perform an action. As the screen reader reads the helpful content, the user is able to comprehend and interact with any displayed dynamic content.

BRIEF DESCRIPTION OF THE DRAWINGS

Figure 1A:
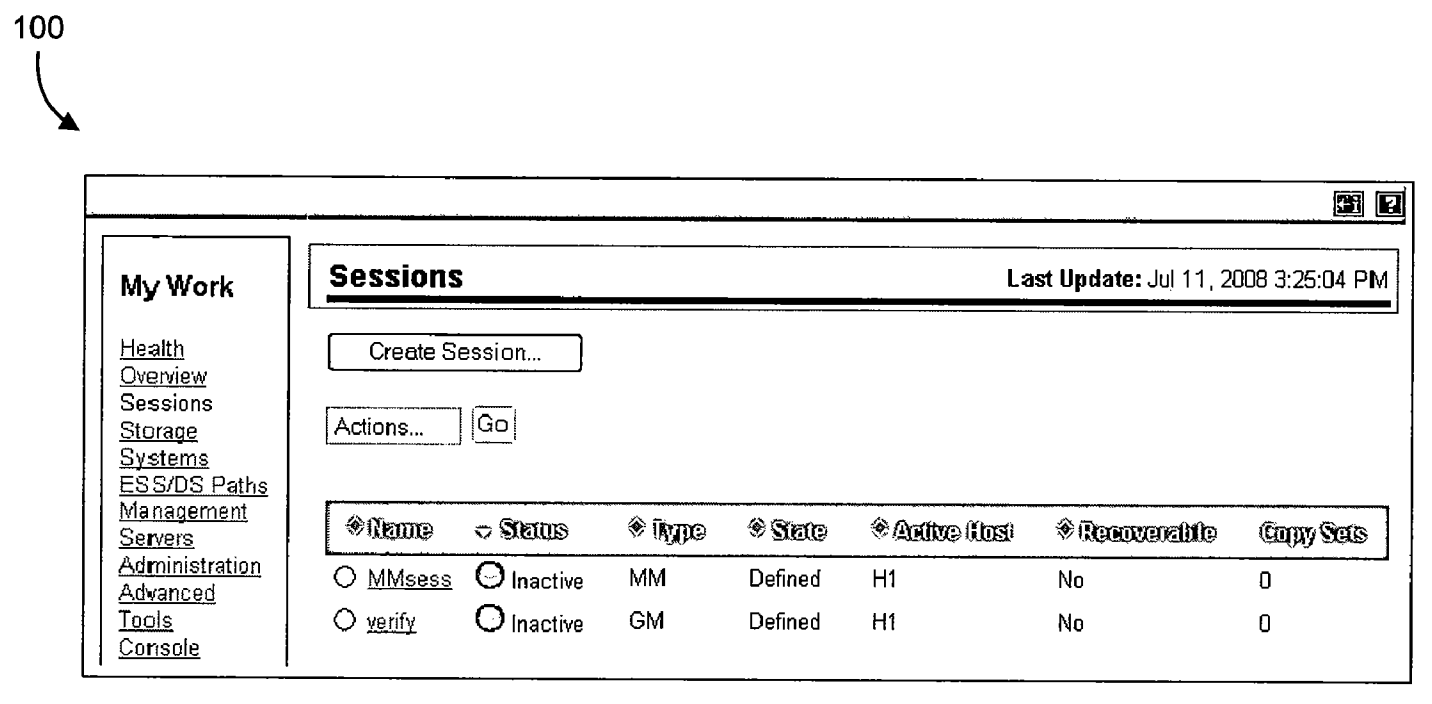

FIGS. 1A-1D illustrates an example of delivering dynamic content through a webpage that is adapted to deliver the dynamic content to sightless users via a screen reader program in accordance with one embodiment of the present invention;

DETAILED DESCRIPTION OF THE INVENTION

Figure 1B:
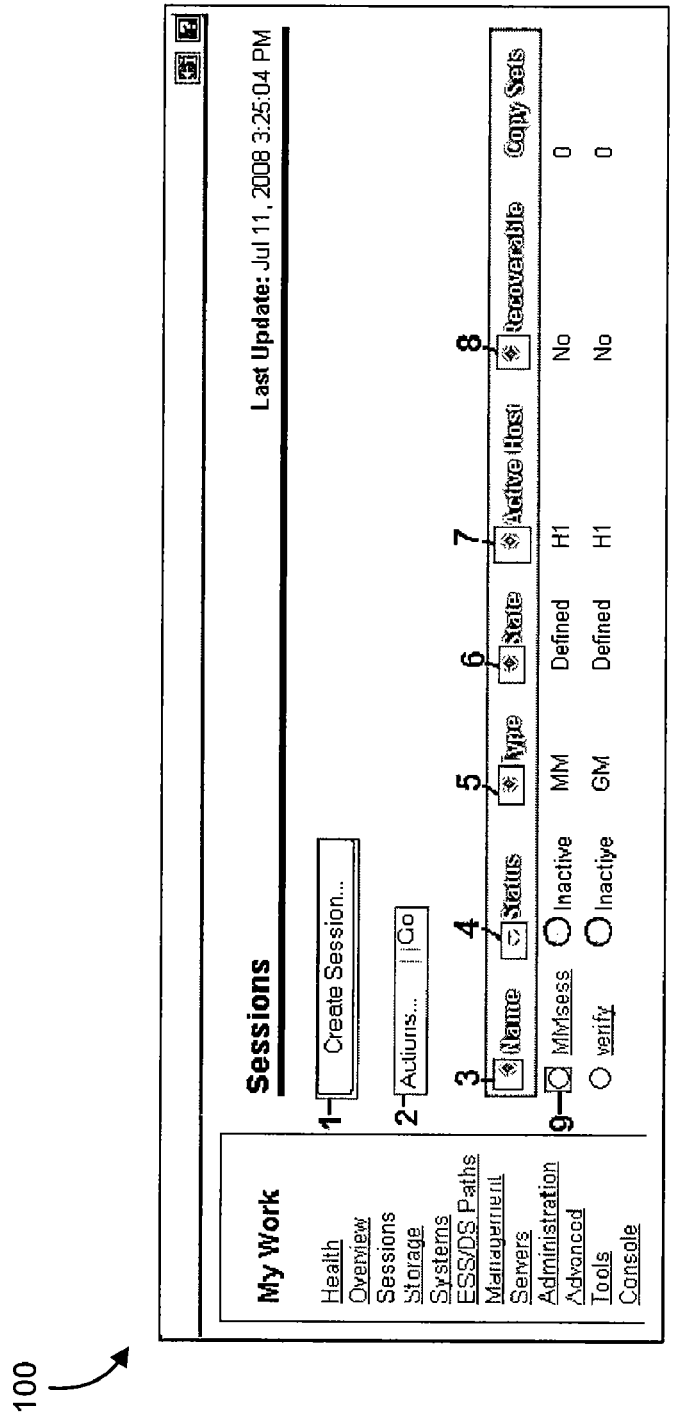
Figure 1C:
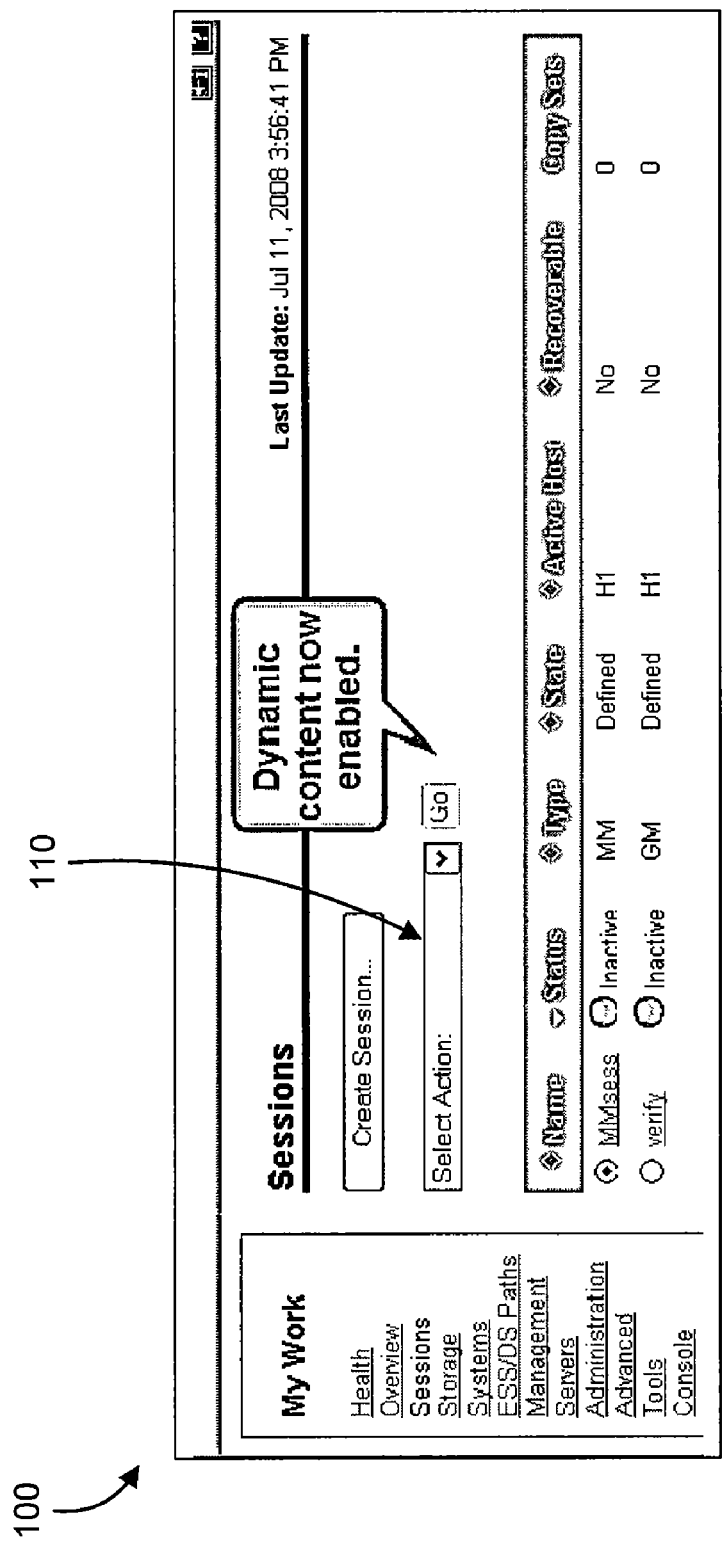

One aspect of the present invention includes providing an adaptive technique for enhancing the sightless accessibility of dynamic web content delivered to screen readers. Accordingly, one embodiment of the present invention employs measures to determine if a user is utilizing a screen reader or other accessibility software on a webpage. Another embodiment of present invention also includes measures to track the position of the screen reader or other accessibility software when accessing the dynamic web content. Furthermore, one embodiment of the present invention includes measures to deliver additional content or alerts to the user via the screen reader to enable the user to appropriately respond to the dynamic changes which have occurred within the webpage.

In one embodiment, detection and/or tracking measures are employed first to determine if the user needs additional processing or special display features for use with a screen reader. For example, website detection measures might include a website control which tracks the use of keyboard navigation versus the use of mouse navigation, or other detection measures may involve the use of a physical device that tracks the eye movement of a user. Further methods of tracking eye movement may include but are not limited to the use of a video camera to focus on the contrast of the center of the pupil using an infrared or other light source to create corneal reflection, to determine by vector analysis the location that the eye is tracking. An alternative method to tracking eye movement for this purpose includes the use of a special apparatus similar to contact lenses that can transmit changes in movement to a radio receiver and then extrapolate the position with known data on screen. If such a tracking mechanism determines the user is viewing the screen in a manner consistent with that of a sighted user, this embodiment of this invention would halt position tracking until it determines that the user's eyes are not fixated or scanning content on the dynamic web page.

Alternatively, the website may require the client to take some confirmatory action to inform the website that a screen reader program is used to access its content. Once the use of a screen reader or other accessibility software is known by the website, the website can respond by delivering content friendly to screen readers. A further embodiment of the present invention therefore involves tracking if the user requires any additional processing and display features, including tracking this setting either within the website or on a setting on the client computer operating the screen reader.

Another embodiment of the present invention involves an implementation of various tracking measures to enable enhanced interaction with the webpage based on the location of the screen reader on the webpage. In one embodiment, listeners are employed within the webpage to detect keyboard-based actions, which may be indicative of screen reader navigation. In another embodiment, a cookie or persistent data share may be employed to track a list of the actions performed by the screen reader and the appropriate location of the screen reader on a website. In still another embodiment, a browser plug-in or Active X extension may be utilized within the web browser or the program interfacing with the screen reader to track the activities and position of the screen reader within the browser and relay any relevant tracking information to the website.

In another embodiment, the webpage containing dynamic content will assign several listener type objects to each widget contained within the webpage. These listeners will track whether the user has clicked on a link using a mouse action, or whether the user has tabbed or otherwise interacted with several other widgets via keyboard or other sequential activity to reach a desired location in lieu of performing mouse actions. The assumption is that a sightless user would not be able to utilize a mouse pointer on the screen, and therefore is solely using keyboard controls when navigating the website. Thus, by the use of the keyboard instead of a mouse, the website can determine if the accessibility tracking system should be activated.

Upon loading of the dynamic web site, another embodiment of the present invention includes creating and loading a browser cookie to track the status of the user preferences and requirements, such as whether the user requires accessible content to be presented in a defined or otherwise modified format. In still a further embodiment, the data within this cookie is encoded to ensure user privacy and to ensure that persons with visual disabilities are not discriminated against, or can otherwise be identified by unwanted entities.

A further embodiment of the present invention includes the use of various "access points" programmed on the server side of the client-server model into the webpage document object model ("DOM"). These access points serve as placeholders for content located after each logical web unit within the webpage. The access points may be configured to deliver content and/or actions when the server sends an associated dynamic content update. Additionally, until dynamic content is added or changed on the webpage, these access points may be configured to be empty and not be disruptive to a screen reader or any visual usage.

This embodiment may also utilize relational tracking via listeners on the client side. These listeners would record the position relative to the user's current location on the webpage and save this information in a persistent data store (such as a cookie or data file). Thus, the location of the user focus can be determined to allow any dynamic content to be inserted just after the user's currently marked location. This will further enable the screen reader to pick up any dynamic content in a linear fashion.

In a further embodiment, the cookie may be configured to track whether or not a specific widget or screen area has been accessed on the website. A numerical value can be assigned to each logical unit within the DOM. As objects are interacted with on a website, a value will be assigned in the cookie to show which object was last activated. Thus, at any time dynamic content has changed on the page, the website can easily determine what the active web unit currently is to deliver specific messages at the user's last active location.

In order to address the fact that users may have a sighted user access the dynamic website (such as by having an assistant access the browser running the screen reader), it may be necessary to change the user status of requiring accessibility features from enabled to disabled. This can be performed dynamically by updating the cookie or other persistent data store in an effort to sustain performance and functionality. In one embodiment, a provision of content tailored for screen readers can simply be disabled when a sighted user accesses several click actions on the page using a mouse or some other activity that is based on or requires visual knowledge of the screen layout.

A further embodiment of the present invention includes various measures taken to respond to dynamic content added to the webpage, such as by alerting the screen reader or the user at the position of relational tracking to the updated content. In one embodiment, to deliver a content message in a format readable only to screen readers and not disruptive to sighted users, a 1×1 image with alt text can be displayed within the webpage, such as at the location specified by the positional tracking cookie. In this manner, as content is updated, messages specific to the change can be added to the end of the sectional unit in order for the screen reader to pick it up.

In a further embodiment, this image which is dynamically displayed could also have an action item(s) associated with it, for the cases that the dynamic change in the webpage involves a widget with interactive content. For example, the image object may have alt text which can be dynamically changed by the webpage to alert or notify the user of a choice of actions in another location on the page. Additionally, the image may also contain link or script properties to enable direct action and response by the user.

FIGS. 1A-1D demonstrate an example sequence of actions on a dynamic web site that are undertaken to convey dynamic content to a user, according to the adaptive technique for delivering dynamic web content to users in one embodiment of the present invention. As referred to in the following section, the "Tab" command can generically refer to any keyboard action made by the user that moves the position of the focus.

First, the user starts up an application to access the website, and utilizes the screen reader to read the content presented within the website. As shown in FIG. 1A, a number of content fields, links, buttons, and selection items may be presented with a dynamic webpage 100. A user then accesses the content on the webpage for use with the screen reader by changing focus to various links, buttons, and text on the page. Meanwhile, the use of the tab navigation on the website alerts the tracking mechanism to keep track of the user's position relative to the webpage. Subsequent tab actions on the page navigate the user to the various content sections of the page.

The user's screen reader will continue to read the content on the website as the tab command is activated and the selected item on the page changes. As shown in FIG. 1B, a number of different selection items exist on the page, with each highlighted step to be read by the screen reader labeled with sequential numbers 1-9.

For example, using the radio button denoted in FIG. 1B with numeral 9, if the user were to press the space bar (to select the radio button), the webpage is configured to perform a dynamic action and update the webpage. The result of this dynamic update is presented in FIG. 1C. As is shown, the "Select Action" dropdown 110 is now displayed at a higher location within the website, above the current focus of the screen reader. With existing screen reader technologies, the sightless user will not be made aware that any change has been made on the webpage, because the screen reader has passed this point in the page, and accordingly a prompt to select an action from the dropdown menu will not be verbally conveyed to the user.

Figure 1D:
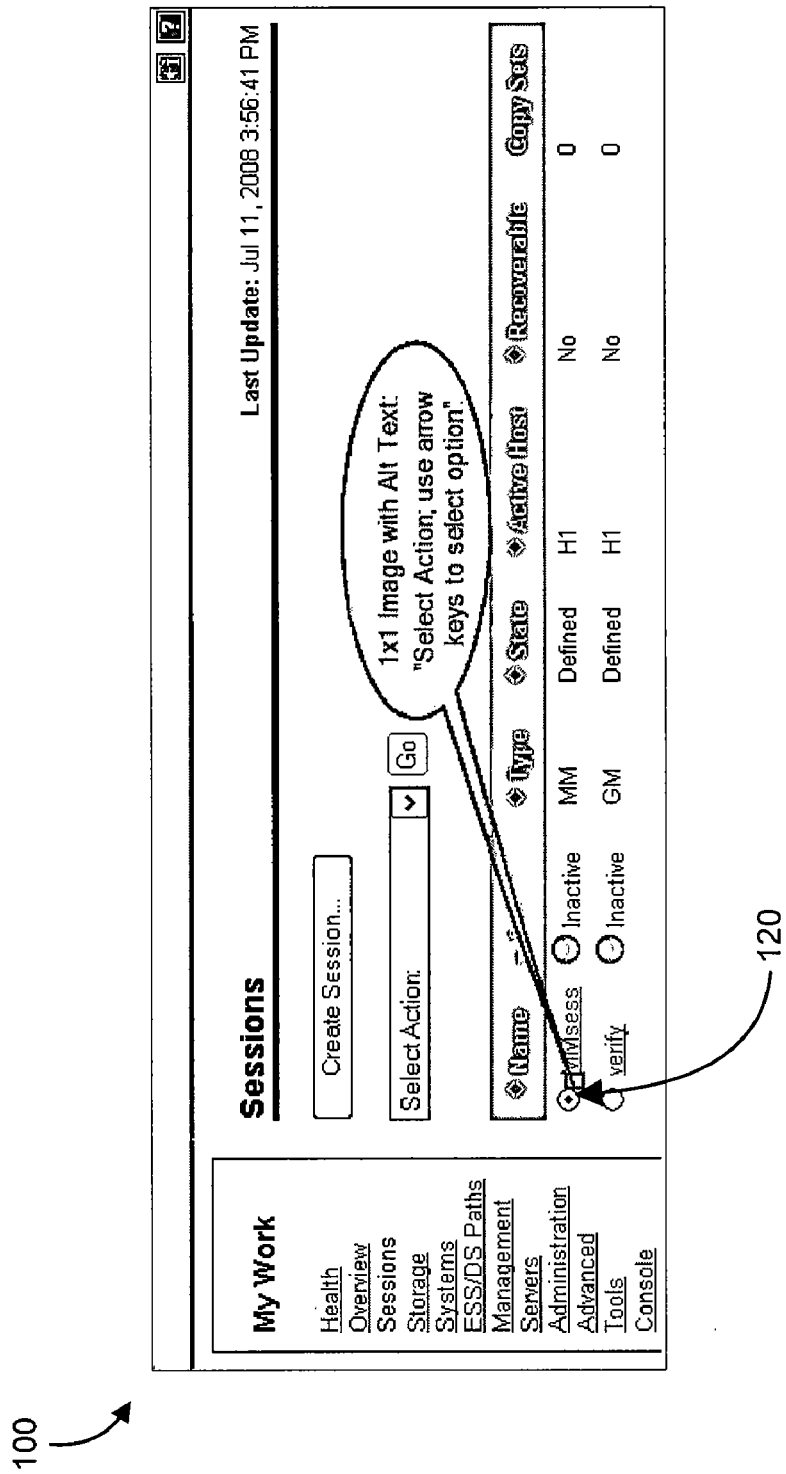

FIG. 1D demonstrates a dynamic webpage which has modified its content to convey an appropriate message to an accessibility software user in accordance with one embodiment of the present invention. In this embodiment, a new object that is configured to be screen readable and/or present an interaction option to the user is dynamically added to the page. As shown, a small 1×1 image 120 is dynamically inserted after the position of the screen reader focus (the radio button), and is inserted with techniques such as the use of client side scripting. This small image contains alt text that is placed inline so that the subsequent keyboard navigation action (e.g., a tab) will select it. Thus, when the user moves the navigation focus to the next item on the page, the alt text will be read to the user by the screen reader, and the user will be notified of the dynamic change with ease.

In the example depicted within FIG. 1D, a 1×1 image or a hidden image is used in order to be non-disruptive to the layout and rendering of the webpage in the case that a sighted user were to use the same workstation. To further blend in with the location of placement, this 1×1 image may apply the attributes of its background through inheritance of the style sheet properties of the parent web unit. Accordingly, FIG. 1D depicts a website that has been adapted for visually limited users, but is still functional using visual commands and appears substantially the same as an unmodified page.

In a further embodiment of the present invention, the values derived from the determination of the relative position that the user (i.e., the screen reader) is focusing on may be sent in response to a request from the server to determine where to insert the accessible unit. One method involves using inline frames ("IFrames"), similar to those commonly used in advertising on dynamic pages, which are logically placed after trigger objects, trigger objects being objects that are designed to cause a change in the page. However, because IFrames may be targets for malicious attacks, their use may not be preferred in all website settings. Further, the use of trigger objects would require implementation in the code of the webpage.

Figure 2:
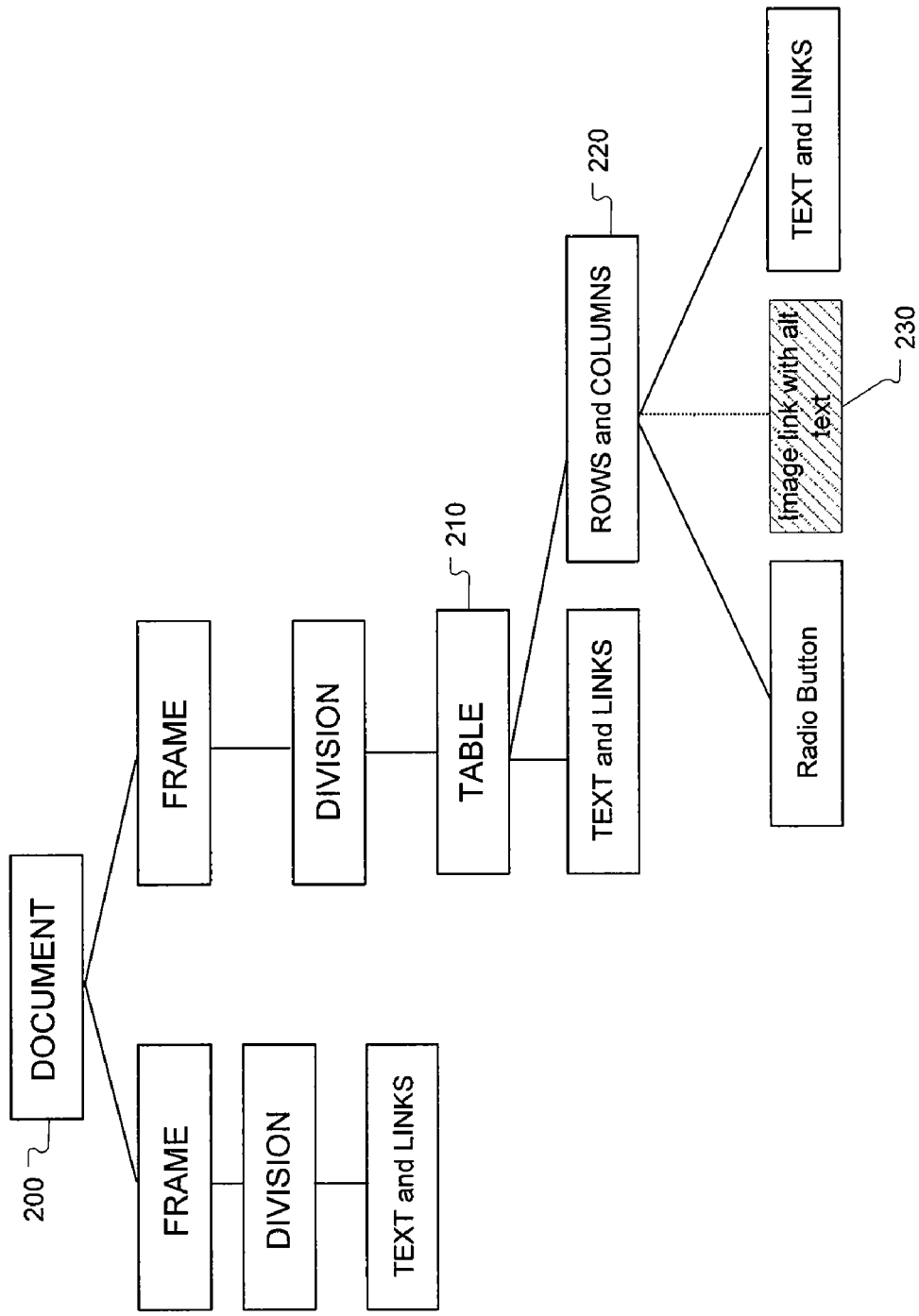
FIG. 2 illustrates an example DOM object model of a webpage that is utilized to position dynamic content for use with a screen reader program in accordance with one embodiment of the present invention.

Additionally, a DOM (Document object model) API insertion into the tree may be made to insert the content at the appropriate location. To illustrate a DOM approach of adding content, a DOM object hierarchy of a sample webpage similar to that depicted in FIGS. 1A-1D is illustrated in FIG. 2 in accordance with one embodiment of the present invention. FIG. 2 more specifically depicts an implementation on the server side DOM object hierarchy where insertion points are included as leaf nodes for each child web object. Additionally, the insertion points may be included via client interaction with the screen reader.

As depicted in FIG. 2, each webpage can be broken up into a tree-like structure with the Document class 200 as the root, and descendant nodes as frames, panels, panes, divisions, tables, and links, etc. Each descendant node contains attributes such as a type, tag, value, and associated actions. FIG. 2 further illustrates a simple DOM implementation of inserting the 1×1 dynamic image 230 as a child of the "Rows and Columns" node 220 of a specific table 210. The child node, or 1×1 image, may either be hidden, or it can inherit its parent's color attribute.

Figure 3:
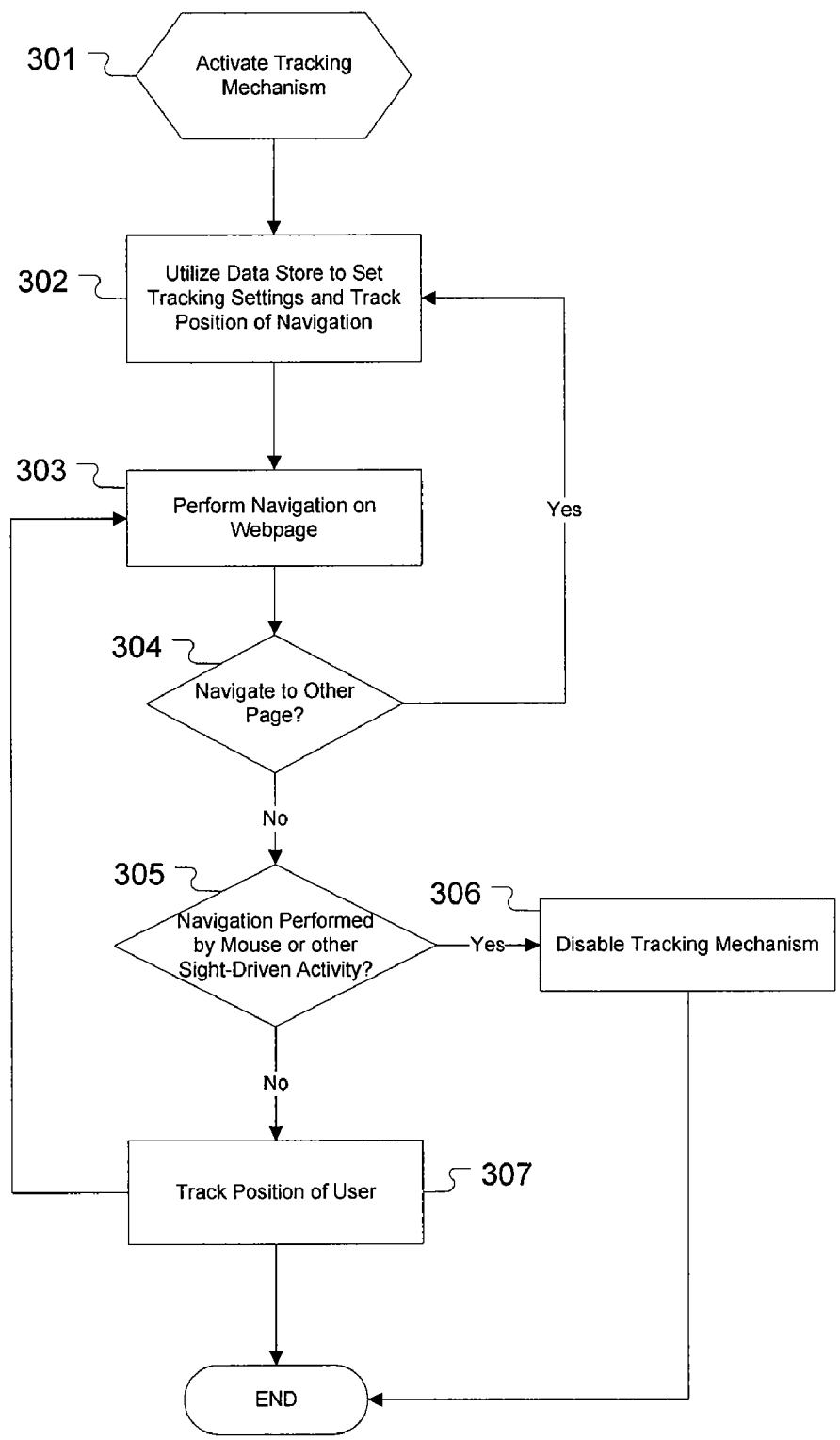
FIG. 3 illustrates an example operation of tracking actions performed by a user who accesses a dynamic web site using accessibility software in accordance with one embodiment of the present invention.

FIG. 3 depicts a flowchart for a method of adaptively improving accessibility of dynamic web content by tracking actions performed by a user on a computer system in accordance with one embodiment of the present invention. As illustrated in FIG. 3, step 301 indicates the tracking mechanism has been activated. In step 302, a small cookie or data store is created to specify any tracking settings (such as the enabled/disabled status of the tracking mechanism) and track the position of the navigation on the webpage. In detail, the tracking settings may specify that the user requires special assistance through the use of a flag which is set to enable tracking the location of the user activity, in addition to tracking data values of the precise location of the user on the webpage. The tracking data may be stored as numerological data such as the nth token read on the page.

Another embodiment of the present invention includes tracking separate objects representing the implemented objects displayed in the webpage. Each object is associated with an action to traverse (i.e., a tab goes to the next valid link, an arrow key moves over a single tokenized string, and so forth), until a table of recognized objects and actions has been created. This table could then be translated to calculate the exact location that the user was last known to access. Additionally, in a further embodiment, an encryption algorithm is employed to the cookie or data store, to increase security and ensure that user privacy is maintained.

Step 303 represents the performance of further navigation actions on the webpage such as use of a TAB key, arrow key, DIV navigation, and the like. These navigational mechanisms may even navigate across sectional units. Step 304 represents the scenario of navigation to another page, in which case tracking resets to a zero reference point and is updated within the cookie or data store in step 302. A similar action may also be performed when navigating to an entirely different section of the page, e.g., selecting a link to navigate to the top of the page or skip to a later section.

Step 305 represents the case where actions are being conducted using a mouse or other sight-driven activity. Upon recognition of mouse interaction across several links (provided that each link has both mouse and key action listeners) the cookie or data store will be updated with information that the relative positional tracking system should be disabled. Step 306 shows the cookie being updated with information that the user no longer requires the tracking operation to be performed.

If the navigation on the webpage is not to another page or section of the page and the navigation is not performed by the mouse or other sight driven activity, the position of the user on the webpage is tracked and updated in the cookie or data store as in step 307. The client side may also implement additional coding measures to ensure positional tracking is accurate. The operation then returns to a waiting state, until the next navigation action is taken as in step 303, or until the navigation on the webpage is complete.

Figure 4:
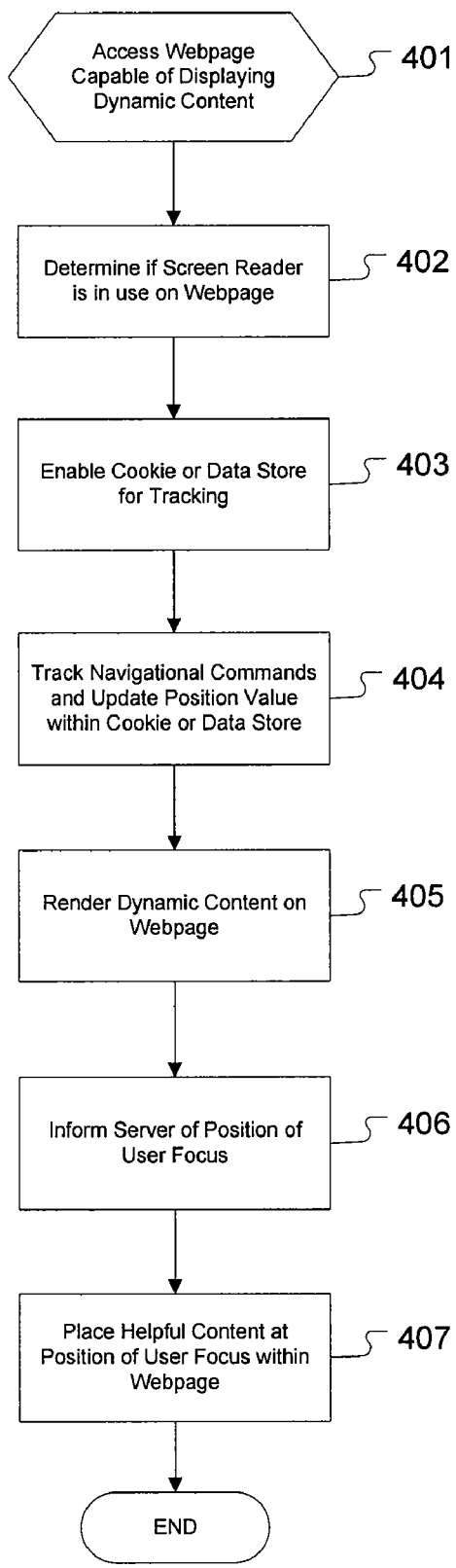
FIG. 4 illustrates an example operation of delivering defined content to a screen reader which accesses a dynamic webpage in accordance with one embodiment of the present invention.

FIG. 4 depicts a flowchart for a method of adaptively improving sightless accessibility of dynamic web content by delivering defined content to a screen reader which accesses a dynamic webpage on a computer system in accordance with one embodiment of the present invention. As depicted, in step

401, the user accesses the webpage containing dynamic content. In step 402, it is determined if a screen reader is in use, such as through reading a setting within a cookie or data store, or detecting if particular keystrokes and keyboard commands by the user relate to the use of a screen reader. Through these measures, this embodiment will be able to determine whether the user requires the tracking system to be enabled.

Thus, as in step 403, if the user uses only keyboard actions, and is not using mouse or other sight dependant actions, the tracking mechanism becomes active and instantiates (or writes to the existing) cookie or equivalent data store object. The information contained in the cookie or data store will indicate that the user requires special needs and rendering for dynamic content displays. Additionally, in a further embodiment, the position within the cookie or data store is set to a zero reference point at the top of the page, i.e., the start path for the screen reader.

As indicated in step 404, each navigational command (such as a TAB event) is tracked, and the cookie or data store is updated with the relative positional information of the position of the screen reader. Step 405 represents the occurrence of an action that causes some dynamic content to be enabled on the screen. This dynamic content is rendered, usually by a mouse listener or action listener on some item, in response to some user action. However, there are also cases where the dynamic content may be time driven or otherwise updated as a result of some external event.

In order to alert the user to the dynamic content change on the webpage, this embodiment contains a listener and a server counterpart. As in step 406, the server is informed that additional information regarding the newly rendered dynamic content must be added to the webpage, by obtaining the position of user focus on the webpage that is stored in the cookie or data store. This information may be acquired from the client by determining the x-y position, the parent node, or the last accessed object as tracked in the cookie or data store, and sending the relative position (such as the nth token or information of the node to be updated) to the server.

Step 407 demonstrates a response by the server, through the placement of content, action objects, or other useful updates to the webpage to enable the screen reader user to understand and respond to the newly rendered dynamic content. This helpful content will be placed at the position of user focus within the webpage, even as the rendered dynamic content will still remain in its original intended location on the webpage. Another embodiment of the invention will intercept the dynamic change and display it at some other desired location marked by the cookie or data store. In either case, the location of the newly added content will be the next item that a screen reader will pick up and read to the user. The end goal is that the information and actions related to the dynamic content are now readily available to the screen reader user without re-reading the entire webpage.

A further embodiment of the present invention includes the use of a tabular lookup table maintained on the client that associates different weights to each object in the webpage. These weights represent the children nodes that are connected to the parent in the DOM, and would assist in determining the exact location and/or confirming that the relational position is tracked correctly from a reference point. With each object there is a possibility of n children, and each child in the DOM can be broken up into smaller parts until the leaf node is reached. The leaf node will be either a section of text read by the screen reader, or an empty object not containing text that will not be read by the screen reader.

Through tree traversal, the use of a "red-black" tree may also be used in a further embodiment of this implementation of the present invention. Traversed objects can be marked with the red attribute and non-traversed objects can be left as black. As one of the properties inherent in Red black trees, it can be determined which items have not been marked as read. The various embodiments of the present invention can then utilize DOM insertion of the dynamic content after the first unread content on the webpage.

Although the use of a screen reader on a webpage is discussed throughout the present disclosure, one skilled in the art would recognize that the techniques utilized for responding to dynamic web content are also applicable to other types of accessibility software, including software for visually impaired users that does not audibly read webpages in a linear fashion. Additionally, one skilled in the art would recognize that the various techniques used for tracking the position on a webpage and delivering content to a specific location on a webpage would be applicable to numerous other settings of content access and delivery, including webpages accessed without the use of accessibility software.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, JSP (Java Server Pages), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for adaptively improving accessibility of dynamic web content by tracking navigation actions performed by a user on a computer system accessing a webpage, comprising:
    determining a screen reader position of focus on the webpage;
    monitoring the webpage for a rendering of dynamic content within the webpage;
    detecting the dynamic content rendered subsequent to a rendering of the webpage and at a content position other than the screen reader position of focus; and
    inserting an object within the previously rendered webpage at the screen reader position of focus responsive to the dynamic content being rendered, wherein the object has attributes of a background of the website, the object is distinct from the dynamic content, the object is not visible on the webpage, and the object comprises text readable by the screen reader describing the dynamic content.

2. The method as in claim 1, wherein the screen reader interprets textual and image descriptive data and conveys the data to the user via non-visual means.

3. The method as in claim 1, wherein the screen reader position of focus is stored in a data store of a browser cookie.

4. A method for adaptively improving sightless accessibility of dynamic web content by delivering enhanced content to a user accessing a webpage on a computer system with a screen reader, comprising:
    determining a screen reader position of focus on the webpage;
    monitoring the webpage for a rendering of dynamic content within the webpage;
    detecting the dynamic content rendered subsequent to a rendering of the webpage and at a content position other than the screen reader position of focus; and
    inserting an object within the previously rendered webpage at the screen reader position of focus responsive to the dynamic content being rendered, wherein the object has attributes of a background of the website, the object is distinct from the dynamic content, the object is not visible on the webpage, and the object comprises text readable by a screen reader describing the dynamic content.

5. The method of claim 4, wherein the text of the object enables the user to perform an action on the webpage.

6. The method of claim 4, wherein the inserted object is an image with an alt text attribute containing instructions relevant to the displayed dynamic content, a size attribute of the image is set to 1×1 pixels, and wherein a background attribute of the image is set to match the background of the website.

7. A system, comprising:
    at least one processor; and
    at least one memory storing instructions operable with the at least one processor for adaptively improving accessibility of dynamic web content by tracking navigation actions performed by a user on a computer system accessing a webpage, comprising:
        determining a screen reader position of focus on the webpage;
        monitoring the webpage for a rendering of dynamic content within the webpage;
        detecting the dynamic content rendered subsequent to a rendering of the webpage and at a content position other than the screen reader position of focus; and
        inserting an object within the previously rendered webpage at the screen reader position of focus responsive to the dynamic content being rendered, wherein the object has attributes of a background of the website, the object is distinct from the dynamic content, the object is not visible on the webpage, and the object comprises text readable by the screen reader describing the dynamic content.

8. The system as in claim 7, wherein the screen reader interprets textual and image descriptive data and conveys the data to the user via non-visual means.

9. The system as in claim 7, wherein the screen reader position of focus data store is stored in a data store of a browser cookie.

10. A system, comprising:
    at least one processor; and
    at least one memory storing instructions operable with the at least one processor for adaptively improving sightless accessibility of dynamic web content by delivering enhanced content to a user accessing a webpage on a computer system with a screen reader, comprising:
        determining a screen reader position of focus on the webpage; and
        monitoring the webpage for a rendering of dynamic content within the webpage;
        detecting the dynamic content rendered subsequent to a rendering of the webpage and at a content position other than the screen reader position of focus; and
        inserting an object within the previously rendered webpage at the screen reader position of focus responsive to the dynamic content being rendered, wherein the object has attributes of a background of the website, the object is distinct from the dynamic content, the object is not visible on the webpage, and the object comprises text readable by a screen reader describing the dynamic content.

11. The system of claim 10, wherein the text of the object enables the user to perform an action on the webpage.

12. The system of claim 10, wherein the inserted object is an image with an alt text attribute containing instructions relevant to the displayed dynamic content, a size attribute of the image is set to 1×1, and a background attribute of the image is set to match the background of the website.

13. A computer program product comprising a computer useable storage medium storing a computer readable program for adaptively improving accessibility of dynamic web content by tracking navigation actions performed by a user on a computer system accessing a webpage, wherein the computer readable program when executed on a computer causes the computer to:
    determine a screen reader position of focus on the webpage;

monitor the webpage for a rendering of dynamic content within the webpage;

detect the dynamic content rendered subsequent to a rendering of the webpage and at a content position other than the screen reader position of focus; and insert an object within the previously rendered webpage at the screen reader position of focus responsive to the dynamic content being displayed, wherein the object has attributes of a background of the website, the object is distinct from the dynamic content, the object is not visible on the webpage, and the object comprises text readable by the screen reader describing the dynamic content.

14. The computer program product as in claim 13, wherein the screen reader used to access the web page interprets textual and image descriptive data and conveys the data to the user via non-visual means.

15. The computer program product as in claim 13, wherein the screen reader position of focus is stored in a data store of a browser cookie.

16. A computer program product comprising a computer useable storage medium storing a computer readable program for adaptively improving sightless accessibility of dynamic web content by delivering enhanced content to a user accessing a webpage on a computer system with a screen reader, wherein the computer readable program when executed on a computer causes the computer to:

determine a screen reader position of focus on the webpage;

monitor the webpage for a rendering of dynamic content within the webpage;

detect the dynamic content rendered subsequent to a rendering of the webpage and at a content position other than the screen reader position of focus; and insert an object within the previously rendered webpage at the screen reader position of focus responsive to the dynamic content being rendered, wherein the object has attributes of a background of the website, the object is distinct from the dynamic content, the object is not visible on the webpage, and the object comprises text readable by a screen reader describing the dynamic content.

17. The computer program product of claim 16, wherein the text of the object enables the user to perform an action on the webpage.

18. The computer program product of claim 16, wherein the inserted object is an image with an alt text attribute containing instructions relevant to the displayed dynamic content, a size attribute of the image is set to 1×1, and a background attribute of the image is set to match the background of the website.

19. The method of claim 1, wherein the inserted object is an image with an alt text attribute containing instructions relevant to the displayed dynamic content, a size attribute of the image is set to 1×1, and a background attribute of the image is set to match the background of the website.

20. The system of claim 7, wherein the inserted object is an image with an alt text attribute containing instructions relevant to the displayed dynamic content, a size attribute of the image is set to 1×1, and a background attribute of the image is set to match the background of the website.

21. The computer program product of claim 13, wherein the inserted object is an image with an alt text attribute containing instructions relevant to the displayed dynamic content, a size attribute of the image is set to 1×1, and a background attribute of the image is set to match the background of the website.

\* \* \* \* \*